(12) United States Patent
Lin

(10) Patent No.: US 7,133,064 B2
(45) Date of Patent: Nov. 7, 2006

(54) METHOD FOR 3:2 PULL-DOWN FILM SOURCE DETECTION

(75) Inventor: Wen-Kuo Lin, Shinyi Chiu (TW)

(73) Assignee: Silicon Integrated Systems Corp., Hsin chu (TW)

( * ) Notice: Subject to any disclaimer, the term of this patent is extended or adjusted under 35 U.S.C. 154(b) by 0 days.

(21) Appl. No.: 11/338,743

(22) Filed: Jan. 25, 2006

(65) Prior Publication Data

US 2006/0119702 A1    Jun. 8, 2006

Related U.S. Application Data

(62) Division of application No. 10/336,719, filed on Jan. 6, 2003, now Pat. No. 7,050,088.

(51) Int. Cl.
*H04N 5/253* (2006.01)

(52) U.S. Cl. .......................... 348/97; 348/441

(58) Field of Classification Search ................. 348/96, 348/97, 441; *H04N 5/253*
See application file for complete search history.

(56) References Cited

U.S. PATENT DOCUMENTS 6,867,814 B1   3/2005   Adams et al.

*Primary Examiner*—Young Lee
(74) *Attorney, Agent, or Firm*—Birch, Stewart, Kolasch and Birch, LLP

(57) ABSTRACT

A method for a 3:2 pull-down film source detection. First, a source is received. Then, field differences of two fields of the same type in the source and an average field difference according to the field difference corresponding to at least one prior field in the source are calculated. The source is established as a 3:2 pull-down film source by checking whether a 3:2 pull-down signature is in the source according to the field difference and the average field difference, and a bad editing point is detected according to an interlaced frame information of the source.

8 Claims, 6 Drawing Sheets

METHOD FOR 3:2 PULL-DOWN FILM SOURCE DETECTION

This application is a Divisional of application Ser. No. 10/336,719, filed on Jan. 6, 2003 now U.S. Pat. No. 7,050,088, and for which priority is claimed under 35 U.S.C. § 120; the entire contents of which are hereby incorporated by reference.

BACKGROUND OF THE INVENTION

1. Field of the Invention

The present invention relates to a source detection method, and particularly to a method for 3:2 pull-down film source detection taking into account the difference between two fields and the interlaced frame information.

2. Description of the Related Art

In practice motion picture sequence can be loosely classified into film (or movie) source and video source. The frame rate of a film source is 24 frames per second while the frame rate of an NTSC video source is 30 frames (or 60 fields) per second. Therefore, to show a film on an NTSC TV system the film frame rate has to be converted from 24 to 30. This frame rate conversion is often called the 3:2 (or 2:3) pull-down process.

FIG. 1 shows one example of the 3:2 pull-down process applied to a film segment of four frames (A, B, C and D). In this case, the original film frames are separated into three or two interlaced fields. That is, frame A and frame C are separated into three fields by duplicating one of their fields, while frame B and frame D are only separated into two fields. The frame rate is therefore converted from 24 frames per second for the original film sequence to 60 fields per second for the interlaced field sequence, and then to 30 frames per second for the interlaced frame sequence.

Since the 3:2 pull-down film sequence is suitable to be played on NTSC interlaced TVs, some annoying comb artifacts remain in the interlaced frames merged from different film frames, such as frame 'A+B' and frame 'B+C' in FIG. 1, if the 3:2 pull-down film sequence is played on progressive TVs or computer monitors. In order to remove the comb artifacts, it is important to detect the 3:2 pull-down film sequence and to apply an inverse process called inverse telecine process to the 3:2 pull-down film sequence to recover the original film frames. Therefore, it is important to recognize and detect the 3:2 pull-down film sequence or the interlaced video sequence for use in different devices.

Further, the 3:2 pull-down film sequence has a unique signature due to the duplication of interlaced fields. The signature is illustrated in FIG. 2 and explained as follows. The fragment of the interlaced fields sequence contains the 3:2 pull-down film source. If the interlaced fields of the same type (i.e., top or bottom) are compared, the comparison result is "10000100001 . . . ', where 1 represents match and 0 represents no match. Hence, the detection between the 3:2 pull-down film sequence and the interlaced video sequence can be performed by alternatively comparing the fields of the same type and seeking the signature of '10000100001 . . . ' in the sequence.

FIG. 3 shows a conventional method for 3:2 pull-down film source detection, discussed accompanying FIG. 2 and 3 as follows. First, the field index n, the MatchCounter and the ModeCounter are set to 0 (S301). The MatchCounter records how many times the 3:2 pull-down signature '10000' has been detected, and the ModeCounter is used as an indicator to signal whether the 3:2 pull-down signature is correct. These two counters are the key indicators for 3:2 pull-down film source detection and will be more clearly explained in the following.

Second, in step S302, two fields of the same type are received (S302) and compared to see if they are identical due to duplication. The comparison is performed by calculating the field difference FieldDiff (S303) given by the sum of absolute difference as, $$FieldDiff = \sum_{y=0}^{M-1}\sum_{x=0}^{N-1} |F(x, y, n) - F(x, y, n+2)|,$$

where M and N are the field height and width respectively. If the FieldDiff is below a threshold Fi_th (yes in step S304), these two fields are recognized as match and the MatchCounter is incremented by 1 and the ModeCounter is cleared to 0 to indicate that the beginning of the signature '10000' (S305). Otherwise, these two fields are not matched and the ModeCounter is incremented by 1 (S306) if the FieldDiff is larger than the threshold Fi_th (no in step S304).

Then, the mode of the source sequence is determined based on the values of the MatchCounter and ModeCounter as illustrated in FIG. 2. If the MatchCounter is larger than 1 and the ModeCounter is equal to 0 (yes in step S307), the flag FilmMode is set to 1 to indicate that a 3:2 pull-down film sequence has been detected (S308). Otherwise, the value of the ModeCounter is used to determine if the sequence follows the signature '10000'. If the ModeCounter is smaller than or equal to 4 (no in step S309), the flag FilmMode is not changed (S310). However, if the ModeCounter is larger than 4, indicating that the sequence no longer follows the 3:2 pull-down signature '10000' (yes in step S309), the flag FilmMode is set to 0 to indicate that the sequence is not a 3:2 pull-down film sequence (S311).

To prevent overflow, the ModeCounter is set to a max_count (S313) if ModeCounter exceeds the predetermined value max_count (yes in step S312). This process repeats along the input sequence for dynamically monitoring the 3:2 pull-down signature (S315 and return to S302) unit the sequence is finished (yes in step S314).

However, conventional methods have two drawbacks. First, due to information loss by digital video compression and digital video processing, the difference between the duplicated fields may exceed the difference threshold Fi_th. Therefore, it is not accurate to determine match by employing the FieldDiff and threshold Fi_th.

Second, the detection for the bad editing point is not effective. For instance, in FIG. 4, the 3:2 pull-down sequence contains good and bad editing points. Since the good editing point follows the 3:2 pull-down order, the signature of '10000' is maintained. Conversely, if the bad editing point breaks the 3:2 pull-down order, the signature no longer follows '10000'. However, such a bad editing point will not be detected until the ModeCounter exceeds 4. Consequently, the output film frames between the bad editing point and the point of detection will be wrongly reconstructed using the inverse telecine process. That is, there will be two frames reconstructed from the merge of field 'H' and 'I', leading to significant reconstruction errors.

SUMMARY OF THE INVENTION

It is therefore an object of the present invention to provide a method for 3:2 pull-down film source detection taking into account the field difference between two fields being compared and the interlaced frame information.

Another object of the present invention is to improve the effectiveness for bad editing point detection by checking the interlaced frame information.

To achieve the above object, the present invention provides a method for 3:2 pull-down film source detection. According to one embodiment of the invention, a source is first received, and coefficients are initialized to zero. The coefficients include a field index as n, a MatchCounter, a ModeCounter, an accumulated field difference accDiff, and an average field difference aveDiff.

Then, a field difference FieldDiff of two fields F(n) and F(n+2) of the same type in the source is calculated, and the FieldDiff is compared to a first threshold Fi_th and an adaptive threshold Adap_th. If the FieldDiff is smaller than the Fi_th and Adap_th, the MatchCounter is incremented by 1 and the ModeCounter, accDiff, and aveDiff are set to 0. If the FieldDiff is not smaller than the Fi_th or Adap_th, the ModeCounter is incremented by 1, the FieldDiff is added to the accDiff, the aveDiff is obtained by dividing the accDiff with the ModeCounter, and the Adap_th is obtained by multiplying the aveDiff and a coefficient K.

Finally, the source is detected as a 3:2 pull-down film source if the MatchCounter is larger than 1 and the ModeCounter is equal to 0, and the source is detected as not being a 3:2 pull-down film source if the MatchCounter is larger than 4.

Further, a bad editing point is detected in the source if the ModeCounter is equal to 3 and a frame corresponding to an interlaced field corresponding to the ModeCounter equal to 3 conforms to the sequence of progressive and interlaced fields of a 3:2 pull-down film source, that is to determine whether the frame is an interlaced frame if the interlaced field is a bottom-field, and to determine whether the frame is a progressive frame if the interlaced field is a top-field.

In addition, a bad editing point is detected in the source if two fields respectively corresponding to the ModeCounter equal to 3 and 4 are progressive when the field corresponding to the ModeCounter equal to 3 is a bottom-field.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION OF THE INVENTION

The present invention loosely determines whether the duplicated fields have been found using the field difference FieldDiff and the difference threshold Fi_th as in the prior art. However, the present invention also exploits a temporarily localized threshold to determine if the FieldDiff is smaller enough to claim that the two fields being compared match. This is based on the presumption that no matter how large the errors introduced into the film sequence during compression or processing, the difference between those two duplicated fields will be always smaller than the difference between other unmatched field pairs. Nevertheless, since the field difference is strongly correlated with the contents in the film sequence, it is more accurate to limit the difference comparison to a temporarily localized film segment. Therefore, in the present invention, an additional threshold is dynamically updated from the results of the prior field difference comparisons.

Figure 1:
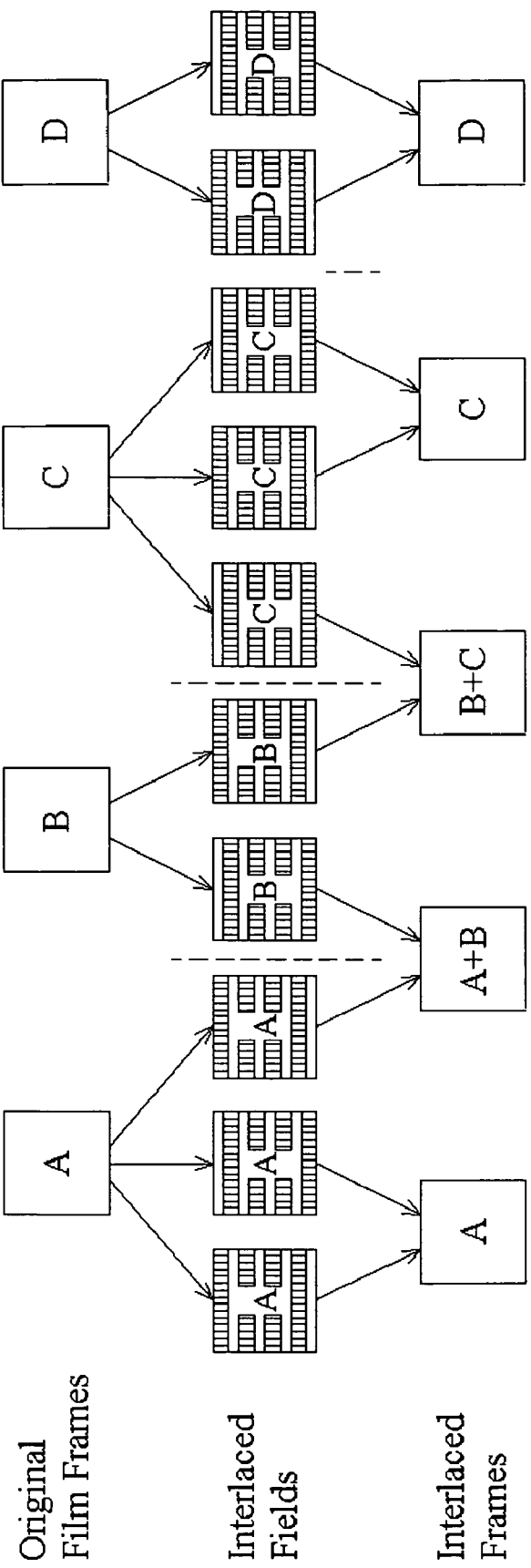
FIG. 1 illustrates one example of the 3:2 pull-down process.

Further, the present invention improves bad editing point detection by referring to the interlaced frame information. This is based on the fact that due to 3:2 pull-down order, the merged interlaced frames in the 3:2 pull-down film sequence have another unique signature of 'PIIPP', where 'P' represents progressive and 'I' represents interlaced. That is, in a group of 3:2 pull-down interlaced frames, the first frame is progressive, the second and the third frames are interlaced, and the last two frames are progressive. This signature can be clearly seen in the example shown in FIG. 1. Therefore, if interlaced frames in a 3:2 pull-down film sequence do not follow such signature, there must be a bad editing point and the inverse telecine process should not be used to recover the film frames for preventing reconstruction errors to occur.

Figure 5:
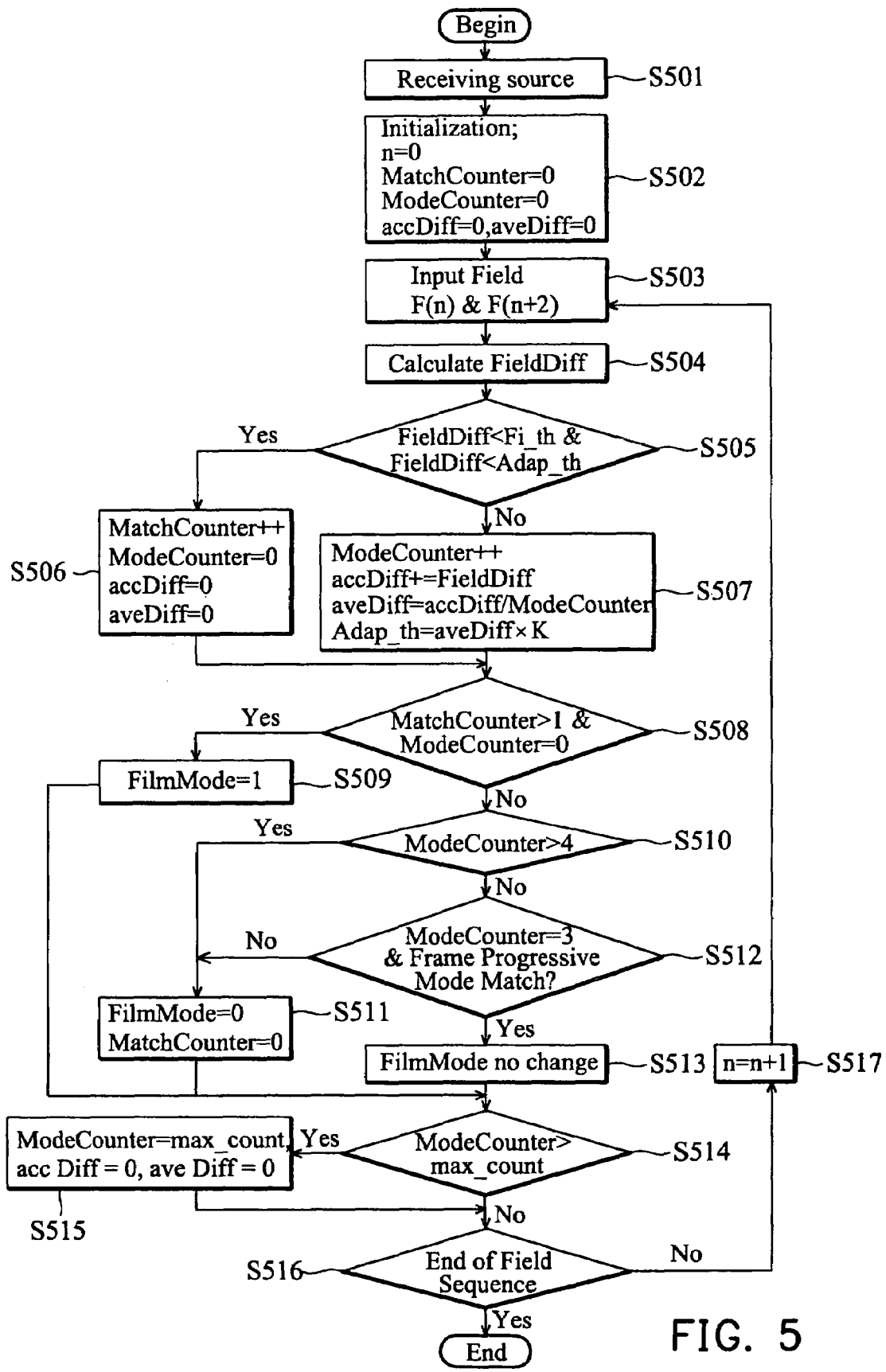
FIG. 5 is a flowchart illustrating the method for 3:2 pull-down film source detection according to the embodiment of the present invention.

FIG. 5 illustrates the method for 3:2 pull-down film source detection according to the preferred embodiment of the present invention. First, in step S501, a source is received, and in step S502, the coefficients used in the detection are initialized to zero. These coefficients include a field index as n, a Match Counter, a ModeCounter, an accumulated field difference accDiff, and an average field difference aveDiff. Similarly, the MatchCounter records how many times the 3:2 pull-down signature '10000' has been detected, and the ModeCounter is used as an indicator to signal whether the 3:2 pull-down signature is correct. Then, in step S503, two fields of the same type (F(n) and F(n+2)) are received and in step S504, the field difference FieldDiff of F(n) and F(n+2) is calculated. Similarly, the field difference FieldDiff is given by the sum of absolute difference as, $$FieldDiff = \sum_{y=0}^{M-1}\sum_{x=0}^{N-1} |F(x, y, n) - F(x, y, n+2)|,$$

where M and N are the field height and width respectively. Thereafter, in step S505, the FieldDiff is compared to two thresholds. The first threshold is Fi_th, which loosely defines the largest field difference allowed between two match fields. The second threshold is an adaptive threshold Adap_th, temporarily updated to determine the largest permitted field difference for two match fields by referring to the content in the field sequence. In this embodiment, Adap_th is a fraction of the average field difference aveDiff from the prior field comparisons and is given by, Adap_th=aveDiff×K, where K is a real number between 0 and 1 and aveDiff is given by, aveDiff=accDiff/ModeCounter:

The assumption made here is that if there are high activity contents in the field sequence, the average field difference aveDiff would be high, as the accumulated field difference accDiff is large. Therefore, the difference permitted between the duplicated fields is high. Whereas, if there are low activity contents in the field sequence, the average field difference aveDiff would be low as the accumulated field difference accDiff is small. Hence, the difference permitted between the duplicated fields is low. It should be noted that the threshold Adap_th should be smaller than Fi_th, and Fi_th and K may be determined according to applications or film types and normally are obtained by experiment.

If the current field difference FieldDiff is smaller than both thresholds, Fi_th and Adap_th (yes in step S505), field F(n) is considered to be match with F(n+2), and F(n+2) is the duplicated field of F(n). After that, in step S506, the MatchCounter is incremented by 1 and the ModeCounter, accDiff and aveDiff are clear to 0. If the FieldDiff is larger than one of the thresholds (no in step S505), then F(n) and F(n+2) do not match. Therefore, in step S507, the ModeCounter is incremented by 1, FieldDiff is added to accDiff aveDiff is obtained by dividing accDiff with ModeCounter, and the adaptive threshold Adap_th is obtained from multiplying aveDiff and coefficient K.

Figure 2:
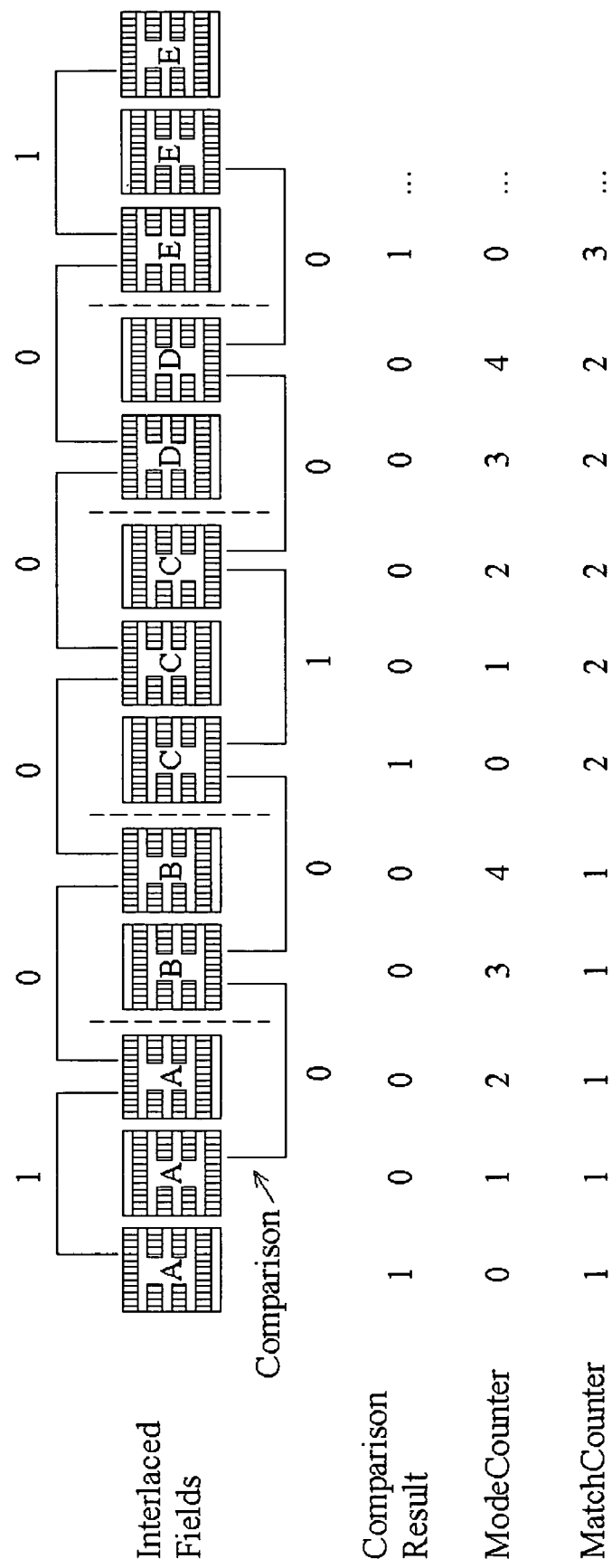
FIG. 2 illustrates the 3:2 pull-down film source and signature thereof.
Figure 3:
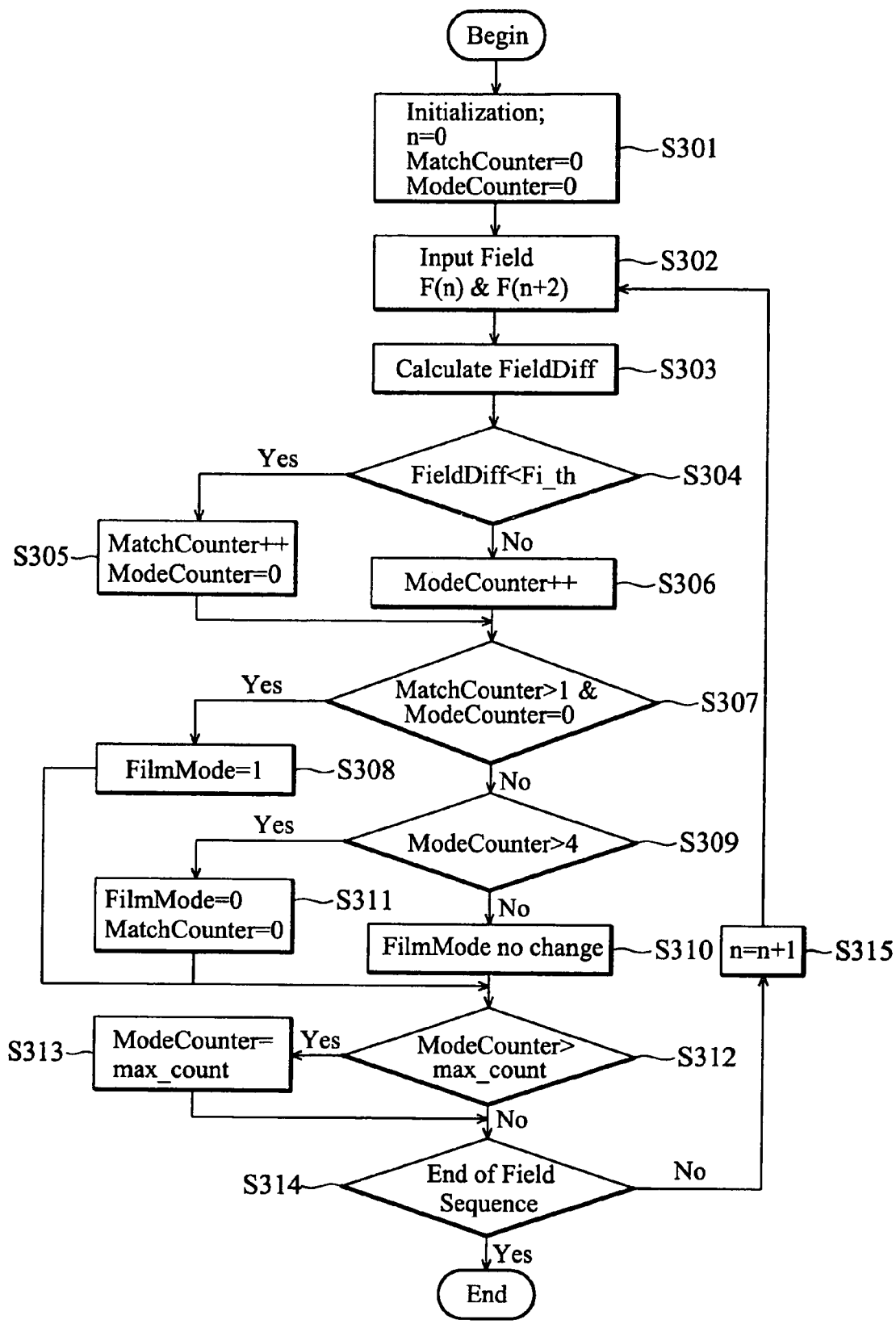
FIG. 3 shows a flowchart of a conventional method for 3:2 pull-down film source detection.
Figure 4:
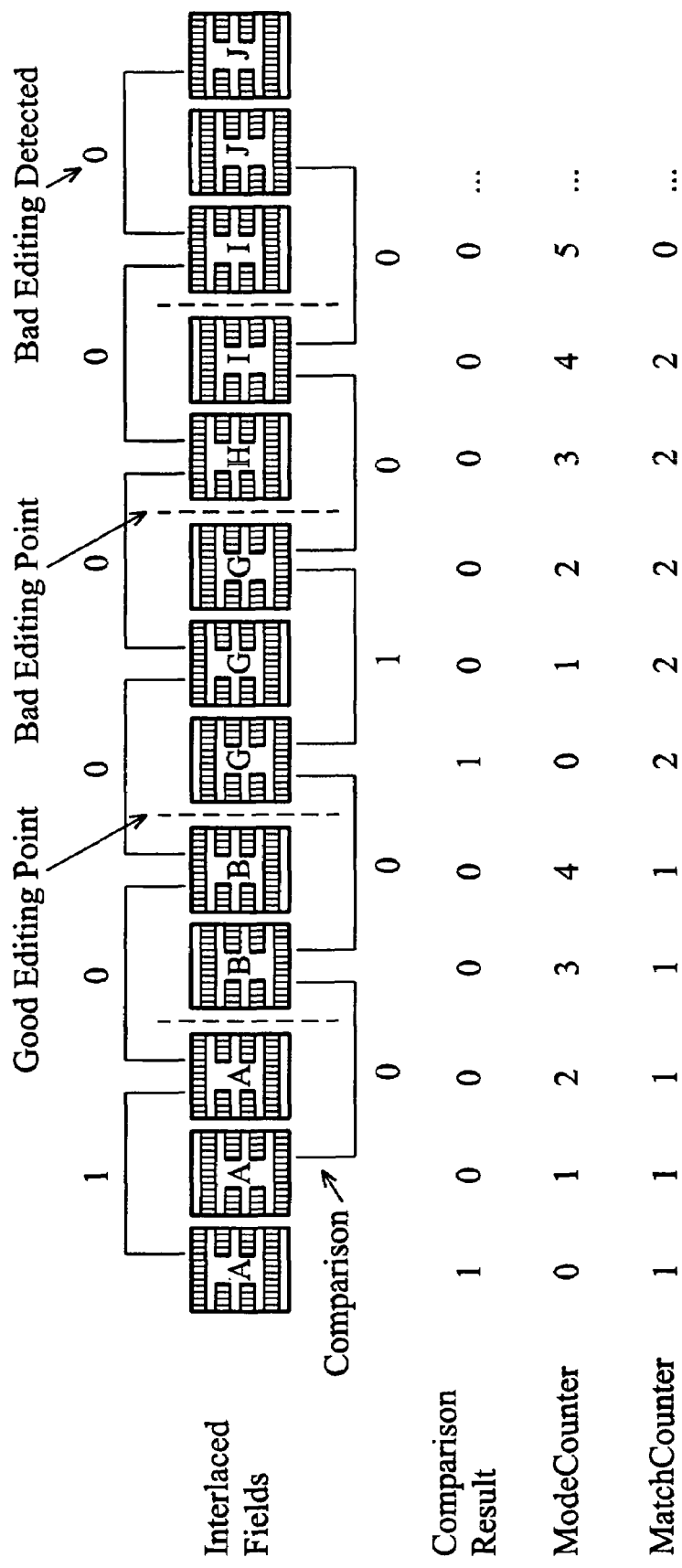
FIG. 4 illustrates a 3:2 pull-down film sequence with a good and a bad editing points.

Afterward, the mode of the source sequence is determined based on the value of the MatchCounter and ModeCounter as illustrated in FIG. 2. If the MatchCounter is larger than 1 and the ModeCounter is equal to 0 (yes in step S508), in step S509, the flag FilmMode is set to 1 to indicate that a 3:2 pull-down film sequence is detected. Otherwise, the value of the ModeCounter is used to determine whether the sequence follows the signature '10000'. If the ModeCounter is larger than 4 (yes in step S510), the sequence no longer follows the 3:2 pull-down signature '10000' and in step S511, the flag FilmMode is set to 0 to indicate that the sequence is not a 3:2 pull-down film sequence. However, if the ModeCounter is smaller than or equal to 4 (no in step S510), the interlaced frame information is used to detect the bad editing point. The interlaced frame information can indicate that the frame is a progressive or an interlaced frame, and the detailed operations of the bad editing point detection are discussed below.

Figure 6:
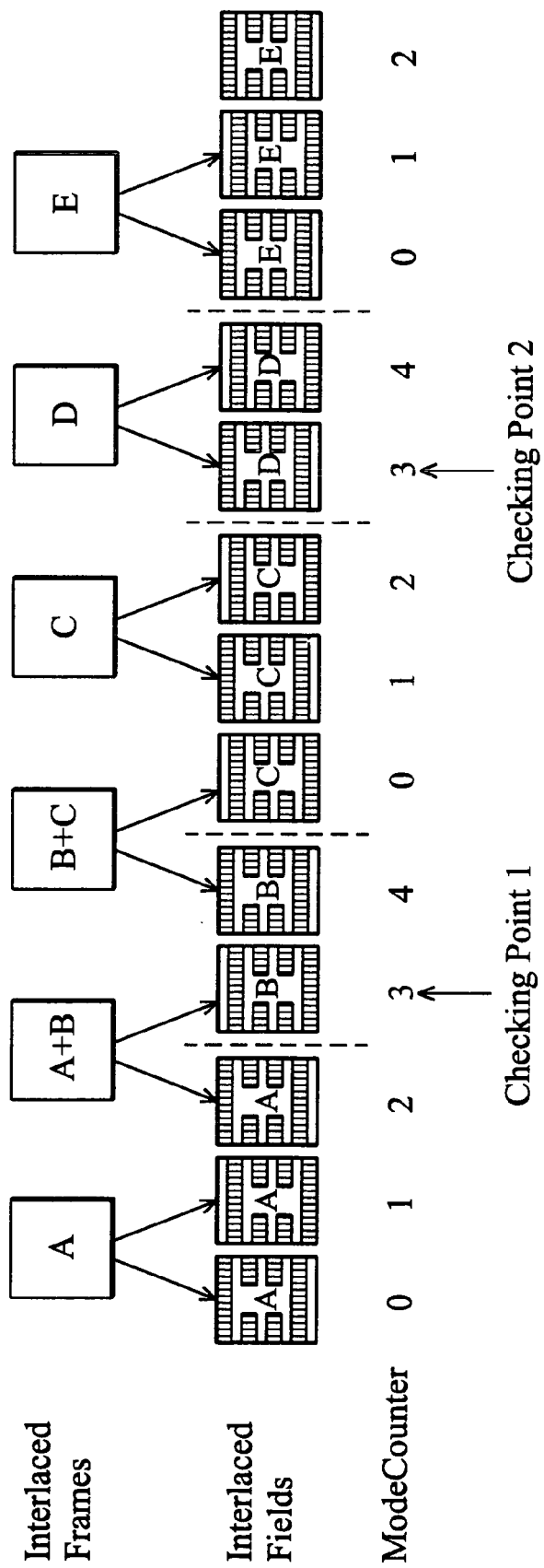
FIG. 6 illustrates an example of the bad editing point detection according to the embodiment of the present invention.

FIG. 6 illustrates an example of bad editing point detection according to the embodiment of the present invention. In FIG. 6, the checking points for the detection are the interlaced fields corresponding to ModeCounter=3. At the first checking point, the interlaced field 'B' is a bottom-field. Therefore, its corresponding interlaced frame 'A+B' and the next interlaced frame 'B+C' should both be interlaced frames according to the 3:2 pull-down order. Hence, if one of these two frames is not interlaced, this checking point is a bad editing point. Likewise, at the second checking point, the interlaced field 'D' is a top-field and its corresponding interlaced frame 'D' should be a progressive frame according to the 3:2 pull-down order. If frame 'D' is not a progressive frame, this point is a bad editing point.

The reason for choosing checking points at the interlaced field corresponding to ModeCounter=3 is if the duplicated fields can be detected, there is no possibility of a bad editing point occuring here. Consequently, the bad editing point may only occur at the fields corresponding to Mode-Counter=3 or ModeCounter=4, and choosing the field of ModeCounter=3 is for early detection, but is not limited thereto.

If there is no bad editing point detected (yes in step S512), in step S513, flag FilmMode will not be changed. However, if a bad editing point is detected (no in step S512), in step S511, the flag FilmMode is set to 0 to indicate that the sequence is not a 3:2 pull-down film sequence, and the MatchCounter is also set to 0.

It should be noted that the bad editing point detection at checking point 1 can also be performed by checking the progressiveness of both 'B' fields corresponding to Mode-Counter=3 and 4. If the result is progressive, then the 3:2 pull-down order is correct, otherwise, there is a bad editing point at this checking point.

After the film mode determination and the bad editing point detection for F(n), in step S515, the ModeCounter is set to a max_count (S313) if ModeCounter is larger than max_count (yes in step S514) for preventing overflow to occur. In addition, for maintaining the adaptive threshold Adap_th to reflect the temporarily localized activity of the film contents, the accDiff and aveDiff are also reset to 0 and will be re-calculated again when checking the next field F(n+1) (S517 and return to S503).

This process repeats along the entire input sequence for dynamically monitoring the 3:2 pull-down source and checking the bad editing points unit the end of sequence (yes in step S516).

As a result, using the method for a 3:2 pull-down film source detection according to the present invention, the input source can be detected as the 3:2 pull-down film source taking into account the differences between two fields and interlaced frame information. Further, the present invention provides more precise bad editing point detection at the exact points where they occur by checking the interlaced frame information.

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A method for 3:2 pull-down film source detection, comprising the steps of:
receiving a source;
initializing coefficients to zero, the coefficients including a field index as n, a MatchCounter, a ModeCounter, an accumulated field difference accDiff, and an average field difference aveDiff;
calculating a field difference FieldDiff of two fields F(n) and F(n+2) of the same type in the source;
comparing the FieldDiff to a first threshold Fi_th and an adaptive threshold Adap_th;
increasing the MatchCounter by 1 and setting the Mode-Counter, accDiff, and aveDiff to 0 if the FieldDiff is smaller than the Fi_th and Adap_th;
increasing the ModeCounter by 1, adding the FieldDiff to the accDiff, obtaining the aveDiff by dividing the accDiff with the ModeCounter, and obtaining the Adap_th from multiplying the aveDiff and a coefficient K if the FieldDiff is not smaller than the Fi_th or Adap_th; and detecting the source as a 3:2 pull-down film source if the MatchCounter is larger than 1 and the ModeCounter is equal to 0.

2. The method for 3:2 pull-down film source detection as claimed in claim 1, further detecting the source as not being a 3:2 pull-down film source if the MatchCounter is larger than 4.

3. The method for 3:2 pull-down film source detection as claimed in claim 1, further detecting bad editing points in the 3:2 pull-down film sequence by determining whether a video frame comprising the video field corresponding to Mode-Counter equal to 3 is a progressive frame or an interlaced frame.

4. The method for 3:2 pull-down film source detection as claimed in claim 3, wherein the bad editing point is detected in the source if the field is a bottom-field and the frame is not an interlaced frame.

5. The method for 3:2 pull-down film source detection as claimed in claim 3, wherein the bad editing point is detected in the source if the field is a bottom-field and any one of an adjacent frame next to the frame and the frame is not an interlaced frame.

6. The method for 3:2 pull-down film source detection as claimed in claim 3, wherein the bad editing point is detected in the source if the field is a top-field and the frame is not a progressive frame.

7. The method for 3:2 pull-down film source detection as claimed in claim 1, further detecting a bad editing point in the source by determining whether two fields respectively corresponding to the ModeCounter as 3 and 4 are progressive.

8. The method for 3:2 pull-down film source detection as claimed in claim 7, wherein the field corresponding to the ModeCounter as 3 is a bottom-field.

* * * * *